US007905343B2

(12) United States Patent
Nakayama et al.

(10) Patent No.: US 7,905,343 B2
(45) Date of Patent: Mar. 15, 2011

(54) SELF-PROPELLED CRUSHING MACHINE

(75) Inventors: Tooru Nakayama, Hirakata (JP); Gousuke Nakashima, Yawata (JP)

(73) Assignee: Komatsu Ltd., Tokyo (JP)

( * ) Notice: Subject to any disclaimer, the term of this patent is extended or adjusted under 35 U.S.C. 154(b) by 71 days.

(21) Appl. No.: 12/476,531

(22) Filed: Jun. 2, 2009

(65) Prior Publication Data

US 2009/0314693 A1 Dec. 24, 2009

(30) Foreign Application Priority Data

Jun. 18, 2008 (JP) ................................ 2008-158926

(51) Int. Cl.
*B65G 17/46* (2006.01)

(52) U.S. Cl. ...................... 198/690.1; 198/301; 198/571

(58) Field of Classification Search .................. 198/301, 198/679, 690.1, 571, 575; 209/218, 223.1, 209/225; 241/101.74, 101.742
See application file for complete search history.

(56) References Cited

U.S. PATENT DOCUMENTS 3,935,947 A * 2/1976 Barrett ...................... 198/690.1
4,659,457 A * 4/1987 Martinez .................... 209/223.1
4,752,384 A * 6/1988 Fauth et al. .................. 209/212
5,060,871 A * 10/1991 Brassinga et al. ................ 241/3
6,325,927 B1 * 12/2001 Green ........................ 198/690.1
7,743,926 B2 * 6/2010 Lewis-Gray ............... 209/223.2
2006/0272928 A1 * 12/2006 Kritzinger .................. 198/690.1

FOREIGN PATENT DOCUMENTS

JP 2003-159546 A1 6/2003

* cited by examiner

*Primary Examiner* — James R Bidwell
(74) *Attorney, Agent, or Firm* — Kratz, Quintos & Hanson, LLP

(57) ABSTRACT

A self-propelled crushing machine is provided which ensures that, even when crushed pieces of an object include a concrete reinforcing steel bar or other like material piece, it is prevented that the concrete reinforcing steel bar will pierce into a conveyor belt. To this end, the crushing machine has a memory for storing a relationship in belt velocities between a conveyor belt and a magnetic separator belt which relationship allows a concrete reinforcing steel bar attracted and adhered to the magnetic separator belt to be taken off of the conveyor belt before the trailing end of the concrete reinforcing steel bar travels past a leading end attraction/adhesion position at which the leading end of the concrete reinforcing steel bar is to be attracted and adhered to the magnetic separator belt. In addition, the crushing machine also includes a controller configured to provide respective control currents to a conveyor belt drive means and a magnetic separator belt drive means, based on the belt velocity relationship stored in the memory.

7 Claims, 8 Drawing Sheets

2(b)

2(a)

3(a)

3(b)

4(a)

4(b)

6(a)

6(b)

SELF-PROPELLED CRUSHING MACHINE

TECHNICAL FIELD

The present invention relates to a self-propelled crushing machine that finds utility in crushing an object to be crushed, e.g., concrete aggregate, fieldstone et cetera, at a job site.

BACKGROUND ART

Such a type of self-propelled crushing machine is constructed such that a hopper, a crusher, a belt conveyor et cetera are incorporated into a base carrier. This self-propelled crushing machine operates as follows. An object (to be crushed) is dumped into the hopper and crushed by the crusher and crushed pieces of the object are conveyed from the crusher to outside the crushing machine by means of the belt conveyor.

However, there are cases where these crushed object pieces include metallic materials (magnetic materials) such as concrete reinforcing steel bar, nails and wire. To cope with the situations, there is proposed a self-propelled crushing machine which employs a magnetic separator disposed over a belt conveyor so that magnetic materials are selectively removed from the crushed object during conveyance by the belt conveyor (see JP-A-2003-159546).

Referring to FIGS. 8(*a*) and 8(*b*), there is illustrated a magnetic separator 100 which is provided with a magnetic separator belt 103 which moves in a direction orthogonal to the travel direction of a conveyor belt 102 in a belt conveyor 101. It is arranged such that a magnet 105 exerts magnetic force to a concrete reinforcing steel bar (magnetic material) 104 on the conveyor belt 102 through the magnetic separator belt 103, whereby the concrete reinforcing steel bar 104 is attracted and adhered to the magnetic separator belt 103 and taken off of the conveyor belt 102.

Incidentally, as shown in FIG. 8(*a*), upon attraction and adhesion of a leading end 104*a* of the concrete reinforcing steel bar 104 to the magnetic separator belt 103, the leading end 104*a* of the concrete reinforcing steel bar 104 is moved together with the magnetic separator belt 103 while on the other hand a trailing end 104*b* of the concrete reinforcing steel bar 104 is moved together with the conveyor belt 102.

At time point $T_1$ (the moment at which the leading end 104*a* of the concrete reinforcing steel bar 104 has been attracted and adhered to the magnetic separator belt 103), the concrete reinforcing steel bar 104, when viewed from the side of the conveyor belt 102, is placed in a tilted position to form an acute angle a with the conveyor belt 102, as illustrated in FIG. 8(*a*).

At time point $T_2$ (the moment at which the trailing end 104*b* of the concrete reinforcing steel bar 104 has reached line L indicative of a leading end attraction/adhesion position at which the leading end 104*a* of the concrete reinforcing steel bar 104 is to be attracted and adhered to the magnetic separator belt 103), the concrete reinforcing steel bar 104, when viewed from the side of the conveyor belt 102, is placed in an upright position that forms a right angle with the conveyor belt 102, as illustrated in FIG. 8(*a*').

Therefore, conventional self-propelled crushing machines may cause the problem that the trailing end 104*b* of the concrete reinforcing steel bar 104 will pierce into the conveyor belt 102 if the relationship in belt velocities between the conveyor belt 102 and the magnetic separator belt 103 is such that the concrete reinforcing steel bar 104 is still on the conveyor belt 102 as shown in FIG. 8(*b*') at time point $T_2$ at which the concrete reinforcing steel bar 104 is placed in an upright position as shown in FIG. 8(*a*').

The present invention is directed to overcoming the foregoing problem with the conventional technology. Accordingly, a primary object of the invention is to provide a self-propelled crushing machine capable of ensuring that, even when the object (to be crushed) contains a concrete reinforcing steel bar or other like material, it is prevented that the concrete reinforcing steel bar will pierce into the conveyor belt.

SUMMARY OF THE INVENTION

In order to accomplish the aforesaid object, the invention provides the following as one embodiment thereof. That is, the invention discloses a self-propelled crushing machine having a conveyor belt which travels carrying crushed pieces of an object crushed by a crusher and a magnetic separator belt which is disposed above the conveyor belt and which travels in a direction intersecting the travel direction of the conveyor belt, whereby magnetic material pieces of the crushed pieces of the object are taken off of the conveyor belt. The self-propelled crushing machine comprises: a conveyor belt drive means by which the conveyor belt is driven at a conveyor belt velocity in response to a given conveyor belt velocity instruction signal; a magnetic separator belt drive means by which the magnetic separator belt is driven at a magnetic separator belt velocity in response to a given magnetic separator belt velocity instruction signal; and a belt velocity instruction signal output means for providing a belt velocity instruction signal to the conveyor belt drive means and to the magnetic separator belt drive means, said belt velocity instruction signal being composed of a conveyor belt velocity instruction signal and a magnetic separator belt velocity instruction signal, said conveyor belt velocity instruction signal being provided to the conveyor belt drive means, and said magnetic separator belt velocity instruction signal being provided to the magnetic separator belt drive means, wherein if the conveyor belt velocity in response to a set conveyor belt velocity instruction signal is higher than the magnetic separator belt velocity in response to the magnetic separator belt velocity instruction signal, the belt velocity instruction signal output means makes a change in the aforesaid belt velocity instruction signal.

In accordance with the invention, even when crushed pieces of an object include a bar-shaped magnetic material (for example, a concrete reinforcing steel bar), the concrete reinforcing steel bar attracted and then adhered to the magnetic separator belt is taken off of the conveyor belt before the trailing end of the concrete reinforcing steel bar travels past a leading end attraction/adhesion position at which the leading end of the concrete reinforcing steel bar is to be attracted and then adhered to the magnetic separator belt, in other words, before the concrete reinforcing steel bar is placed in an upright position (as viewed from the side of the conveyor belt) to form right angles with the conveyor belt, thereby ensuring that it is prevented that the concrete reinforcing steel bar will pierce into the conveyor belt.

DETAILED DESCRIPTION OF THE INVENTION

Referring now to the accompanying drawings, a description will be made about a concrete embodiment of a self-propelled crushing machine according to the invention.

Figure 1:
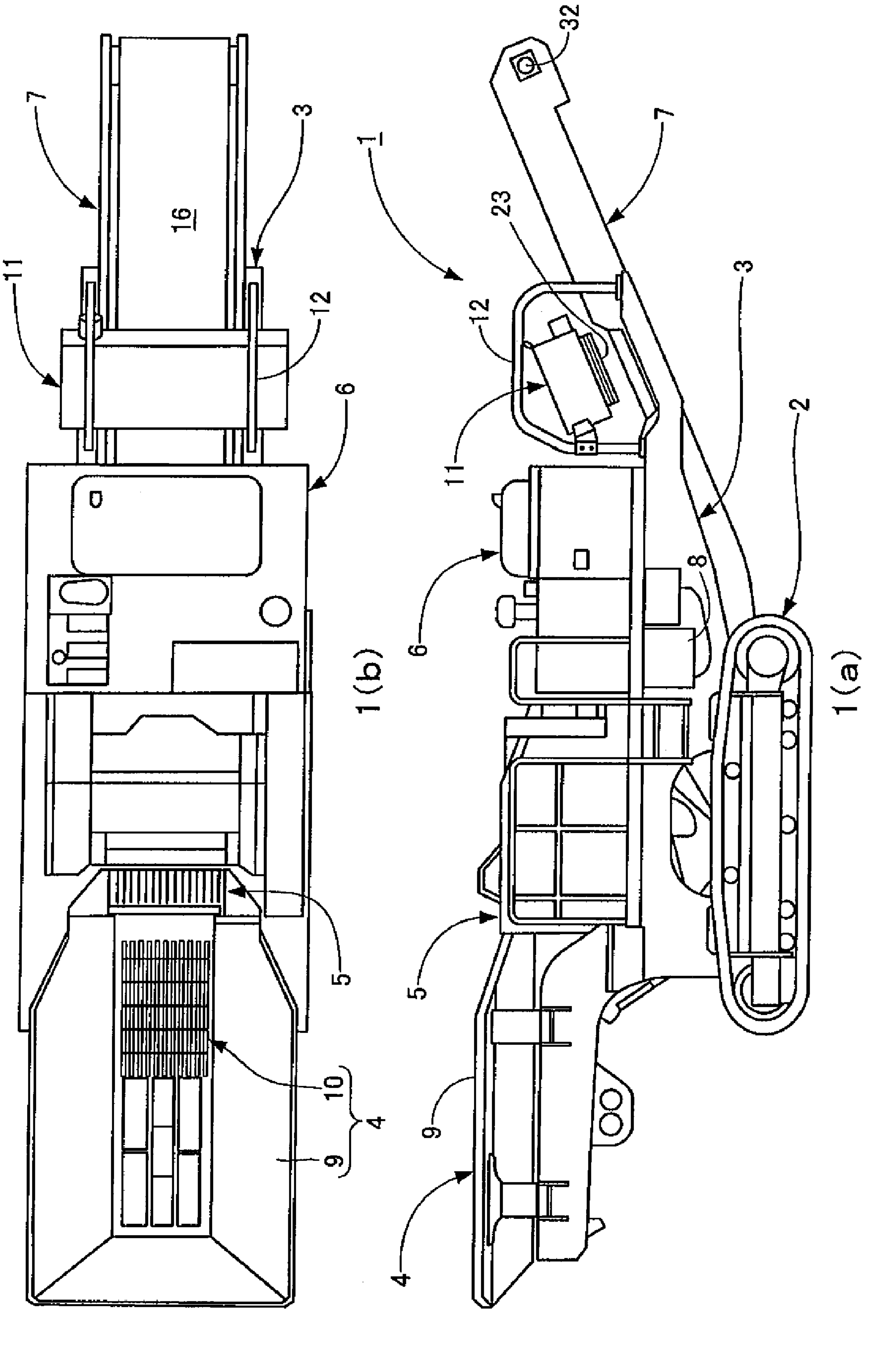
FIG. 1, comprised of FIGS. 1(*a*) and 1(*b*), shows a self-propelled crushing machine according to one embodiment of the invention wherein FIG. 1(*a*) is a side view and FIG. 1(*b*) is a plan view.

FIGS. 1(*a*) and 1(*b*) illustrate in side view and in plan view respectively a self-propelled crushing machine according to one embodiment of the invention.

Figure 2:
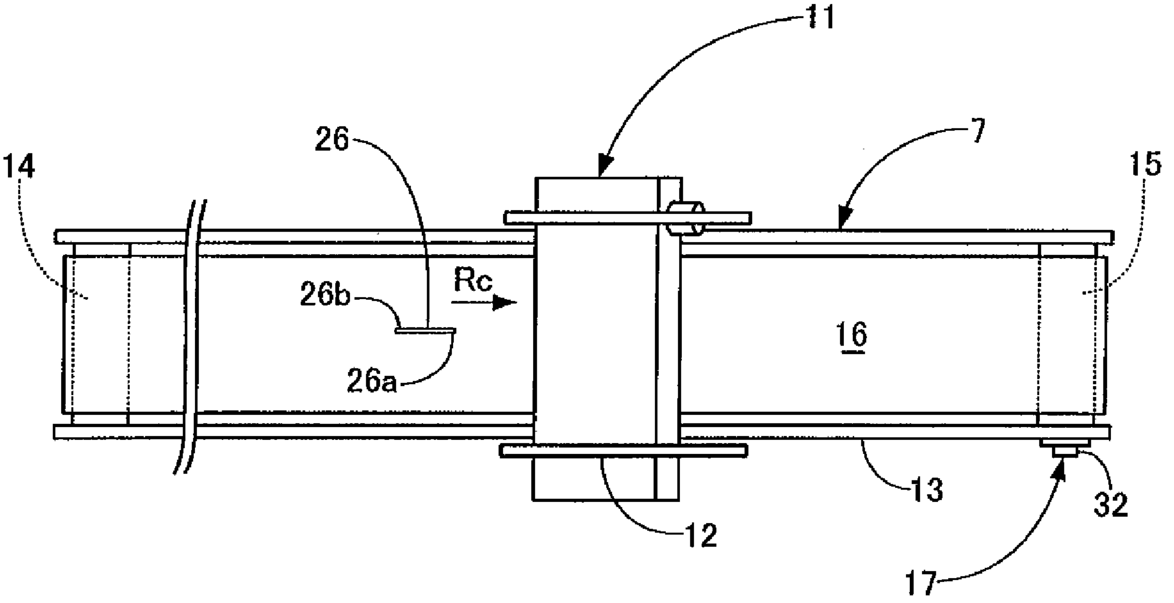
FIG. 2, comprised of FIGS. 2(*a*) and 2(*b*), shows a belt conveyor and a magnetic separator that are mounted on the self-propelled crushing machine of the embodiment wherein FIG. 2(*a*) is a side view and FIG. 2(*b*) is a plan view.
Figure 2:
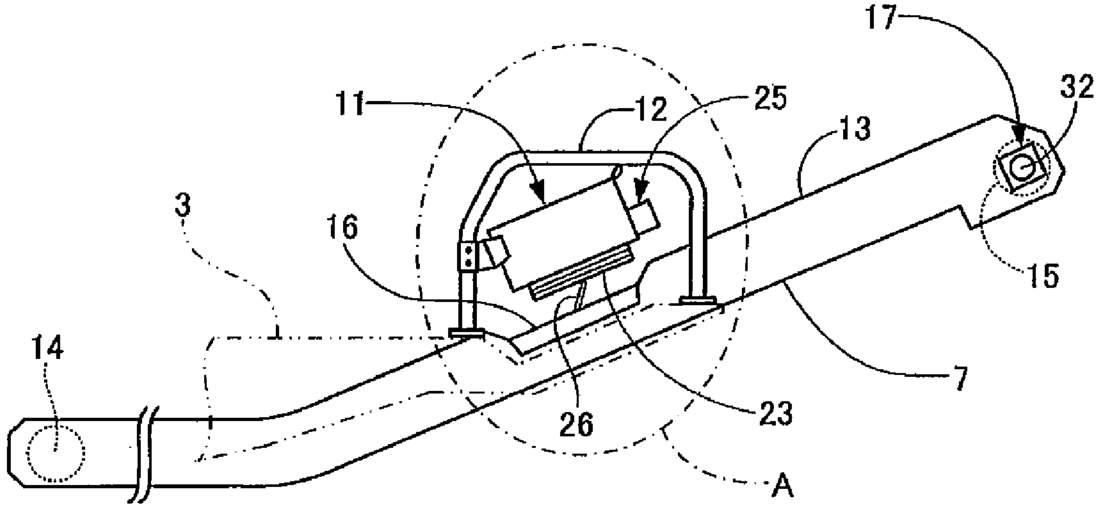

FIGS. 2(*a*) and 2(*b*) illustrate in side view and in plan view respectively a belt conveyor and a magnetic separator both mounted on the self-propelled crushing machine of the embodiment.

The self-propelled crushing machine 1 shown in FIG. 1(*a*) is adapted to crush, at a job site, an object (to be crushed) (e.g., construction and demolition waste including concrete aggregate, industrial waste, fieldstone et cetera) into small pieces for the on-site production of small crushed pieces of the object having good reusability or transportability.

The self-propelled crushing machine 1 has a base carrier 2 equipped with a track-type undercarriage. A body frame 3 is fixedly mounted on the base carrier 2.

An object-to-be-crushed feeder 4 is mounted in a front section of the body frame 3. A crusher (jaw crusher) 5 is provided in the middle of the body frame 3, and an engine compartment 6 is provided in a rear section of the body frame 3.

The body frame 3 is provided, in its lower part, with a belt conveyor 7 which extends towards the back from a position under the crusher 5. A console panel 8, containing measuring instruments for monitoring the self-propelled crushing machine 1 and various control units for use in drive operations, is mounted in place in the body frame 3.

As illustrated in FIG. 1(*b*), the object-to-be-crushed feeder 4 is composed of a hopper 9 into which an object (to be crushed) is dumped and a feeder 10 by which the dumped object in the hopper 9 is conveyed towards the crusher 5.

As illustrated in FIGS. 1(*a*) and 1(*b*), a magnetic separator 11 is disposed behind the engine compartment 6 so that it is located above the belt conveyor 7. The magnetic separator 11 is supported in a hanging manner by a magnetic separator support frame 12 which is assembled onto the body frame 3.

As shown in FIGS. 2(*a*) and 2(*b*), the belt conveyor 7 has: a conveyor frame 13 extending in a front/rear direction; an idler pulley 14 and a drive pulley 15 that are rotatably mounted respectively on the front and rear ends of the conveyor frame 13; a conveyor belt 16 mounted in a wound manner around the idler and drive pulleys 14 and 15; and a conveyor belt drive means 17 configured to drive the conveyor belt 16. In addition, the belt conveyor 7 is constructed such that, when the conveyor belt 16 is brought into rotating motion driven by the conveyor belt drive means 17, crushed pieces of the object, dropped from the crusher 5 (see FIG. 1) onto the conveyor belt 16, are taken out to behind the self-propelled crushing machine 1.

Figure 3:
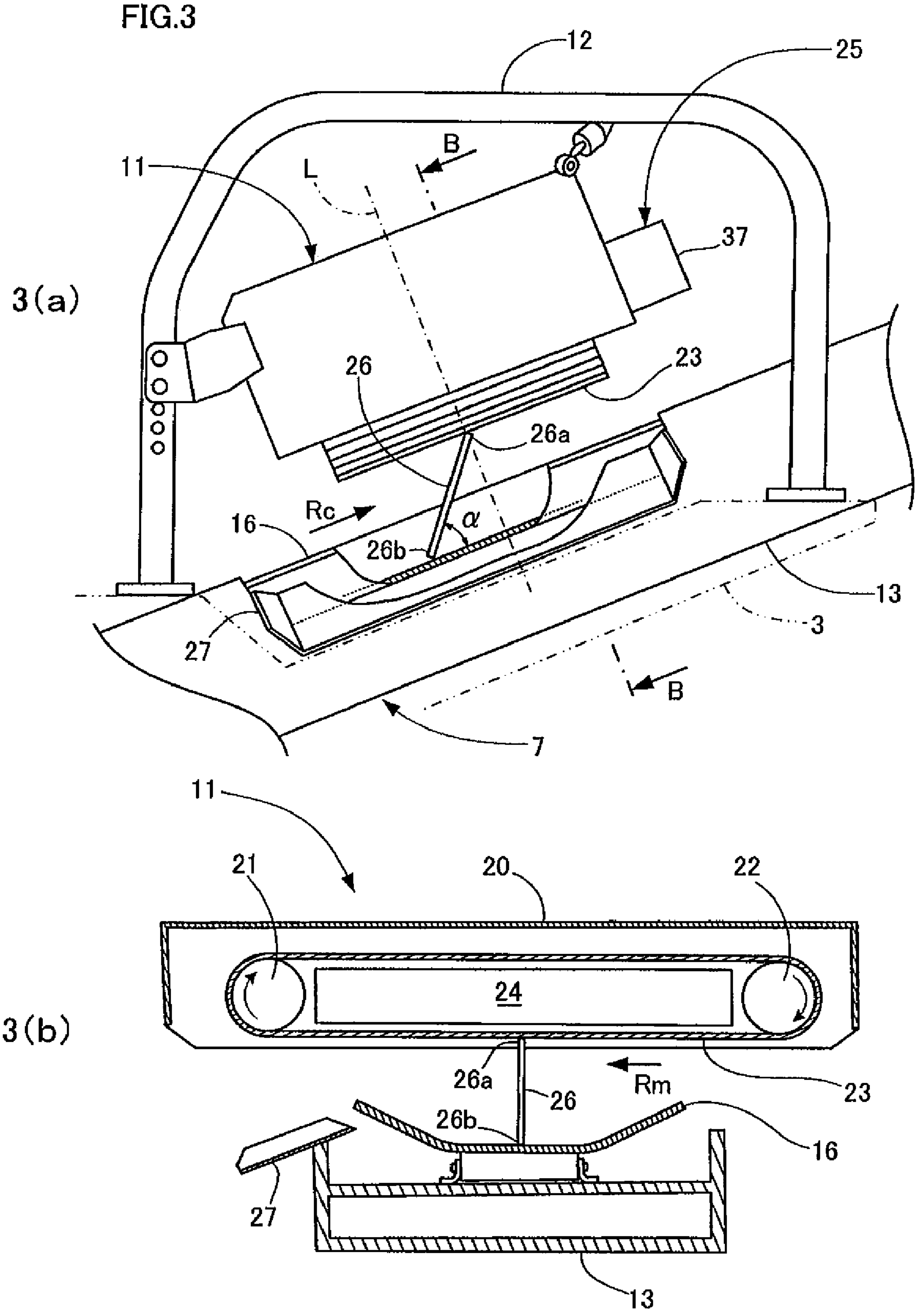
FIG. 3, comprised of FIGS. 3(*a*) and 3(*b*), is an enlarged view of section A of FIG. 2(*a*) wherein FIG. 3(*a*) illustrates the point of time at which the concrete reinforcing steel bar is attracted and adhered to a magnetic separator belt and FIG. 3(*b*) is a cross-sectional view taken along line B-B of FIG. 3(*a*).

As shown in FIGS. 3(*a*) and 3(*b*), the magnetic separator 11 has: an idler pulley 21 and a drive pulley 22 that are rotatably mounted on a magnetic separator casing 20 at a given axial distance apart from each other in a direction orthogonal to the belt travel direction, Rc, of the conveyor belt 16; a magnetic separator belt 23 mounted in a wound manner around the idler and drive pulleys 21 and 22 so as to be disposed face to face with the conveyor belt 16; a magnet 24 firmly secured to the magnetic separator casing 20 through a fixing means (not shown) so as to be located between the idler pulley 21 and the drive pulley 22; and a magnetic separator belt drive means 25 for driving the magnetic separator belt 23. In addition, the magnetic separator 11 is constructed such that, when the magnetic separator belt 23 is made to travel around the magnet 24 driven by the magnetic separator belt drive means 25, the magnet 24 exerts its magnetic force to, for example, a concrete reinforcing steel bar (bar-shaped magnetic material) 26 on the conveyor belt 16 through the magnetic separator belt 23, whereby the concrete reinforcing steel bar 26 on the conveyor belt 16 is attracted and adhered to the magnetic separator belt 23 and then taken off of the conveyor belt 16 by way of a concrete reinforcing steel bar discharge chute 27 attached to the side of the conveyor frame 13.

Figure 5:
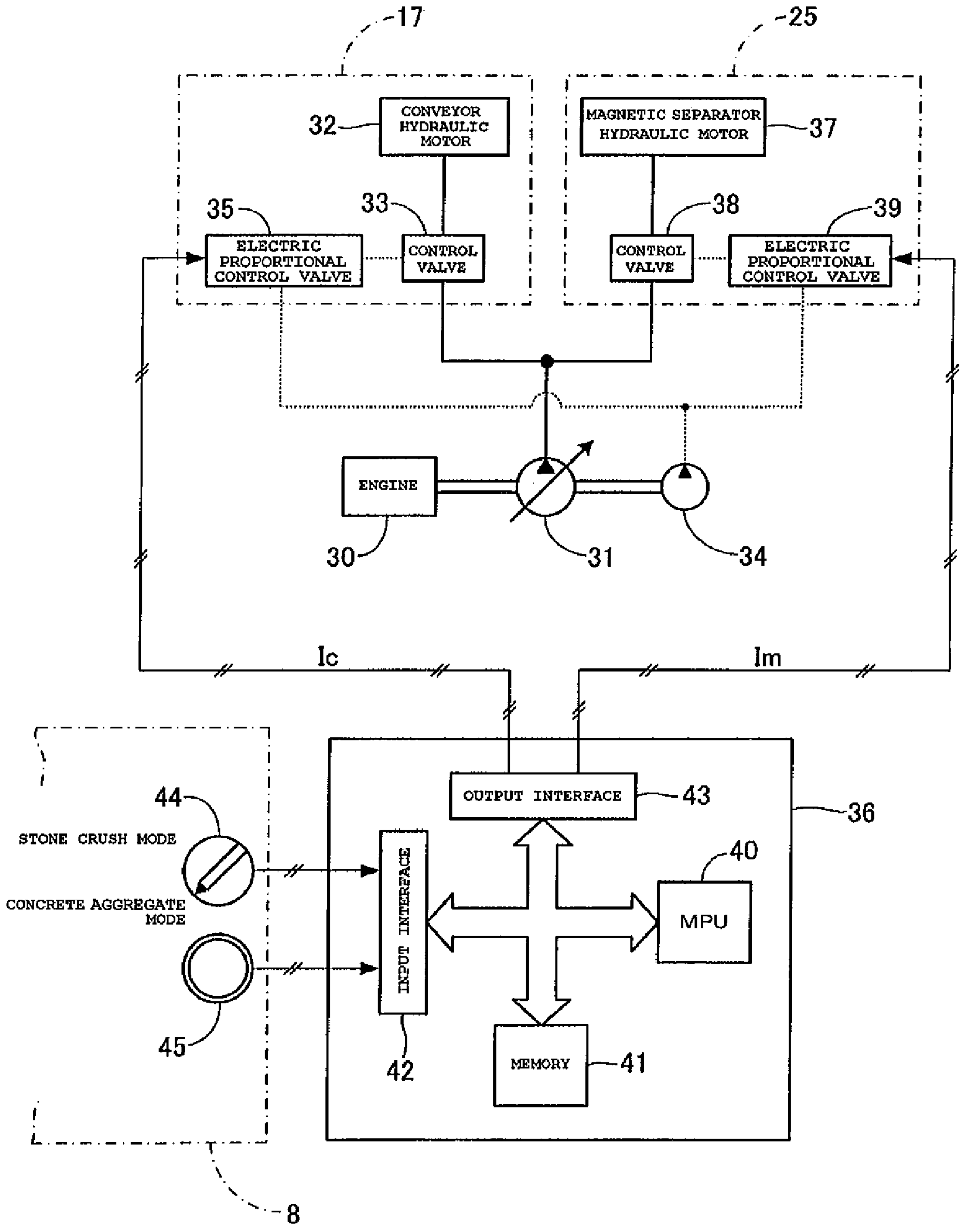
FIG. 5 is a block diagram outlining the system configurations of a conveyor belt drive means, a magnetic separator belt drive means, and their control systems.

Next, the configurations of the conveyor belt drive means 17, the magnetic separator belt drive means 25, and their control systems will be explained below with reference to the block diagram of FIG. 5.

The conveyor belt drive means 17 has: a conveyor hydraulic motor 32 for rotationally driving the drive pulley 15 upon supply of operating oil from a main hydraulic pump 31 driven by an engine 30 that serves as the power source of the self-propelled crushing machine 1; a control valve 33 for controlling the rate of flow of operating oil supplied from the main hydraulic pump 31 to the conveyor hydraulic motor 32 in response to a pilot pressure; and an electric proportional valve 35 for adjusting the pilot pressure provided by a pilot hydraulic pump 34 driven by the engine 30 to the control valve 33 in response to the control electric current. In addition, the conveyor belt drive means 17 is adapted to drive the conveyor belt 16 in order that the conveyor belt velocity may become responsive to the control current (which corresponds to the "conveyor belt velocity instruction signal" in the invention) supplied from a controller 36 to the electric proportional control valve 35.

The magnetic separator belt drive means 25 has: a magnetic separator hydraulic motor 37 for rotationally driving the drive pulley 22 upon supply of operating oil from the main hydraulic pump 31; a control valve 38 for controlling the rate of flow of operating oil supplied from the main hydraulic pump 31 to the magnetic separator hydraulic motor 37 in response to the pilot pressure; and an electric proportional control valve 39 for regulating the pilot pressure provided by the pilot hydraulic pump 34 to the control valve 38 in response to the control current. The magnetic separator belt drive means 25 is adapted to drive the magnetic separator belt 23 in order that the magnetic separator belt velocity may become responsive to the control current (which corresponds to the "magnetic separator belt velocity instruction signal" in the invention) supplied from the controller 36 to the electric proportional control valve 39.

The controller 36 is configured such that it has a microprocessor (MPU) 40 for executing arithmetic processing in accordance with the instruction of a program; a memory 41 (which corresponds to the "memory means" in the invention) for storage of programs, data, and other like information; an input interface 42 for conversion of input signals into signals for processing by the MPU 40; and an output interface 43 for controlling, based on the result of the arithmetic processing by the MPU 40, the magnitude of control currents provided to each of the electric proportional control valves 35 and 39.

Also, it should be noted that the configuration including the MPU 40 and the output interface 43 corresponds to the "belt velocity instruction signal outputting means" of the invention.

The console panel 8 includes a mode select switch 44 for selective switching between a concrete aggregate mode and a stone crush mode, and a conveyor belt velocity control dial 45 for manual adjustment of the belt velocity of the conveyor belt 16. The mode select switch 44 and the conveyor belt velocity control dial 45 are each connected to the input interface 42 of the controller 36.

In addition, the concrete aggregate mode is an operation mode which is intended for crushing a chunk of concrete mixed with concrete reinforcing steel bars or the like and whose operation conditions (such as crushing velocity) are set such that a chunk of concrete is crushed efficiently by the crusher 5. The concrete aggregate mode corresponds to the "specific operation mode" of the invention.

The stone crush mode is an operation mode which is intended for crushing of fieldstone and whose operation conditions (such as crushing velocity) are set such that fieldstone is crushed efficiently by the crusher 5.

In addition, by controlling the belt velocity of the conveyor belt 16 by means of the conveyor belt velocity control dial 45, the operator is allowed to set any conveyor belt velocity depending on the properties of objects to be crushed.

Figure 6:
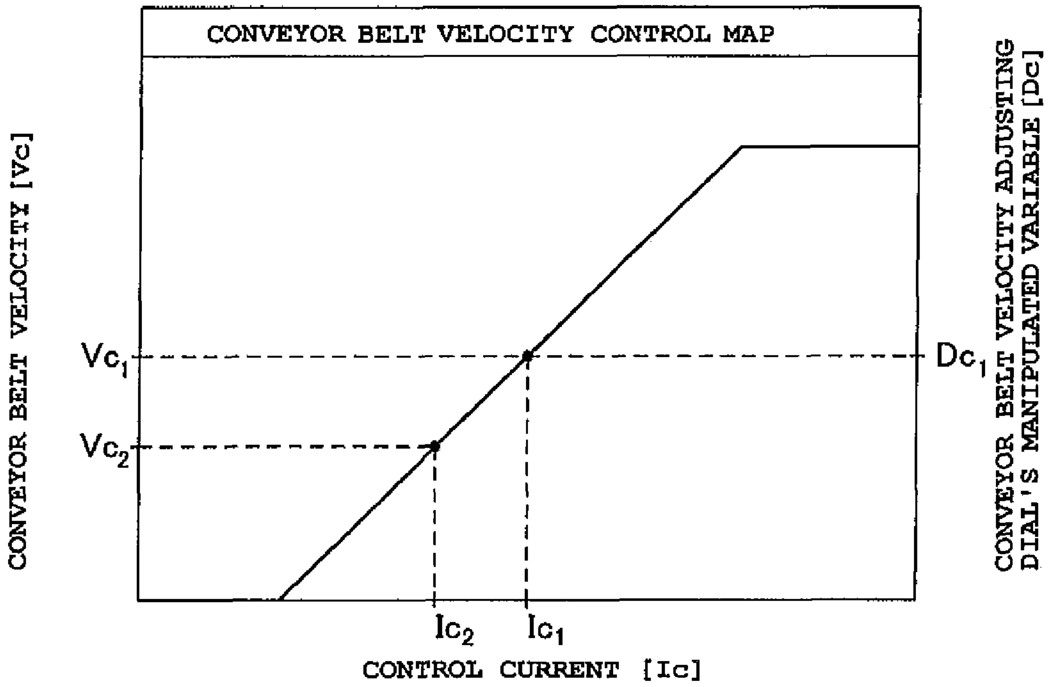
FIG. 6 is comprised of FIGS. 6(*a*) and 6(*b*) wherein FIG. 6(*a*) is a conveyor belt velocity control map and FIG. 6(*b*) is a magnetic separator belt velocity control map.
Figure 6:
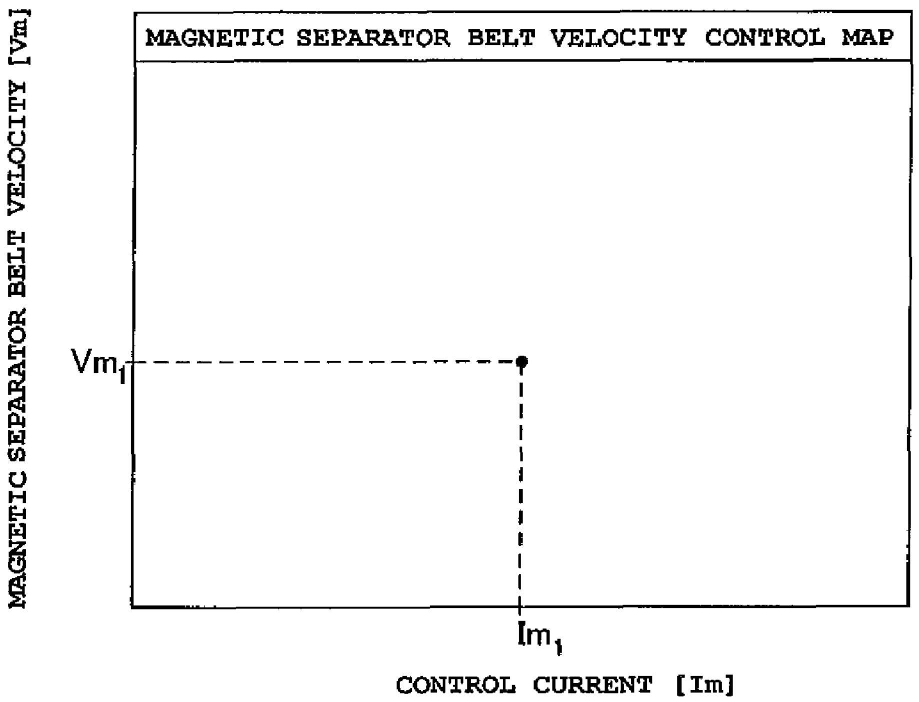

The memory 41 of the controller 36 stores a conveyor belt velocity control map (shown in FIG. 6(*a*)) and a magnetic separator belt velocity control map (shown in FIG. 6(*b*)). Additionally, the memory 41 also stores a belt velocity control program prepared based on the algorism shown in the flow chart of FIG. 7.

The MPU 40 retrieves the belt velocity control program stored in the memory 41 and takes in signals from the mode select switch 44 and the conveyor belt velocity control dial 45 according to the instruction of the retrieved belt velocity control program. With reference to the conveyor belt velocity control map and to the magnetic separator belt velocity control map, both stored in the memory 41, the MPU 40 performs arithmetic to calculate the value of the control current for supplying to each of the electric proportional control valves 35 and 39 and then transmits the control current value obtained by the arithmetic calculation to the output interface 43 as a set control current value. The output interface 43 provides control of the magnitude of the control current in order that the magnitude of the control current for supplying to each of the electric proportional control valves 35 and 39 may have a set control current value.

Figure 7:
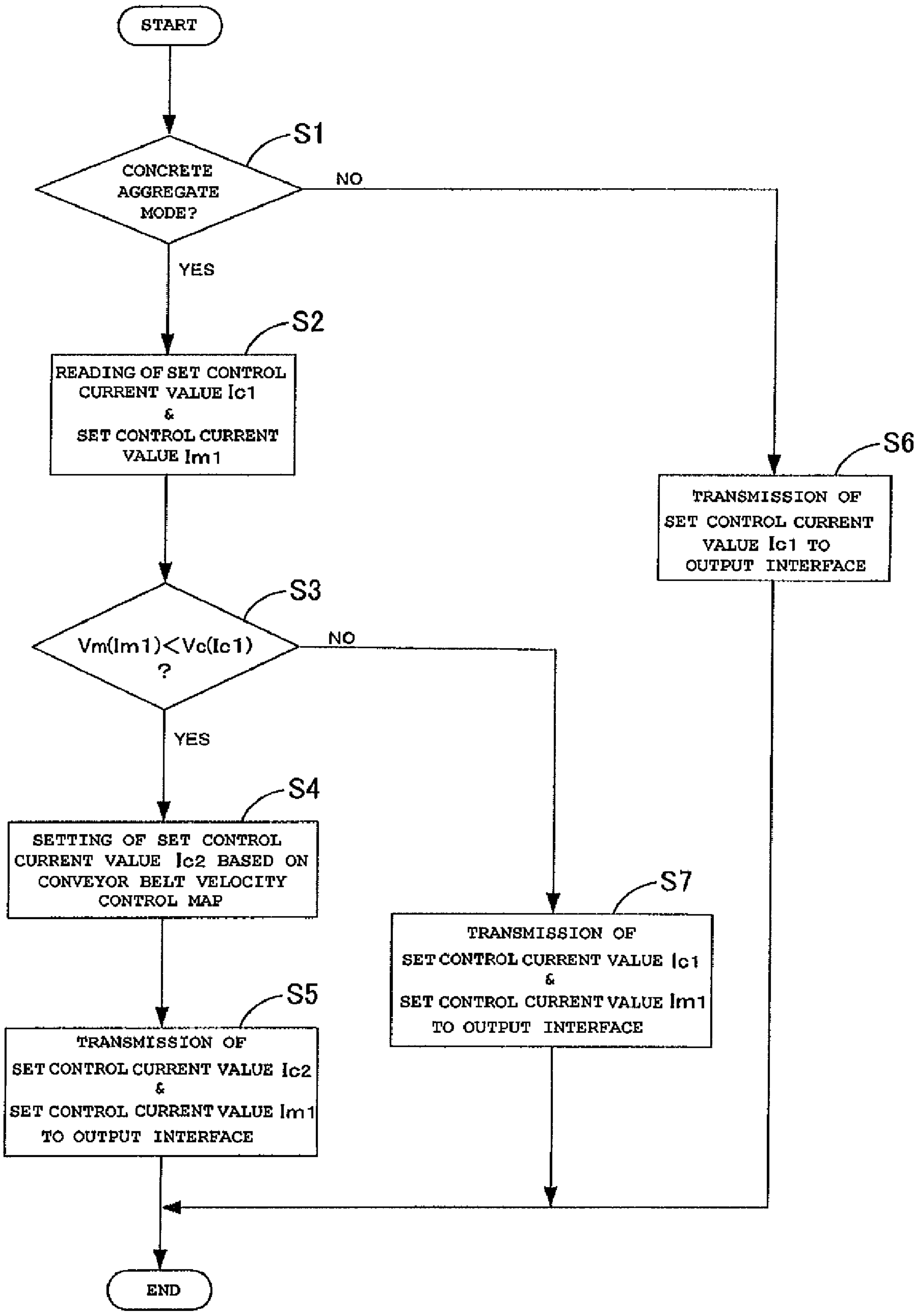
FIG. 7 is a flow chart illustrating the contents of processing of a belt velocity control program.
Figure 8:
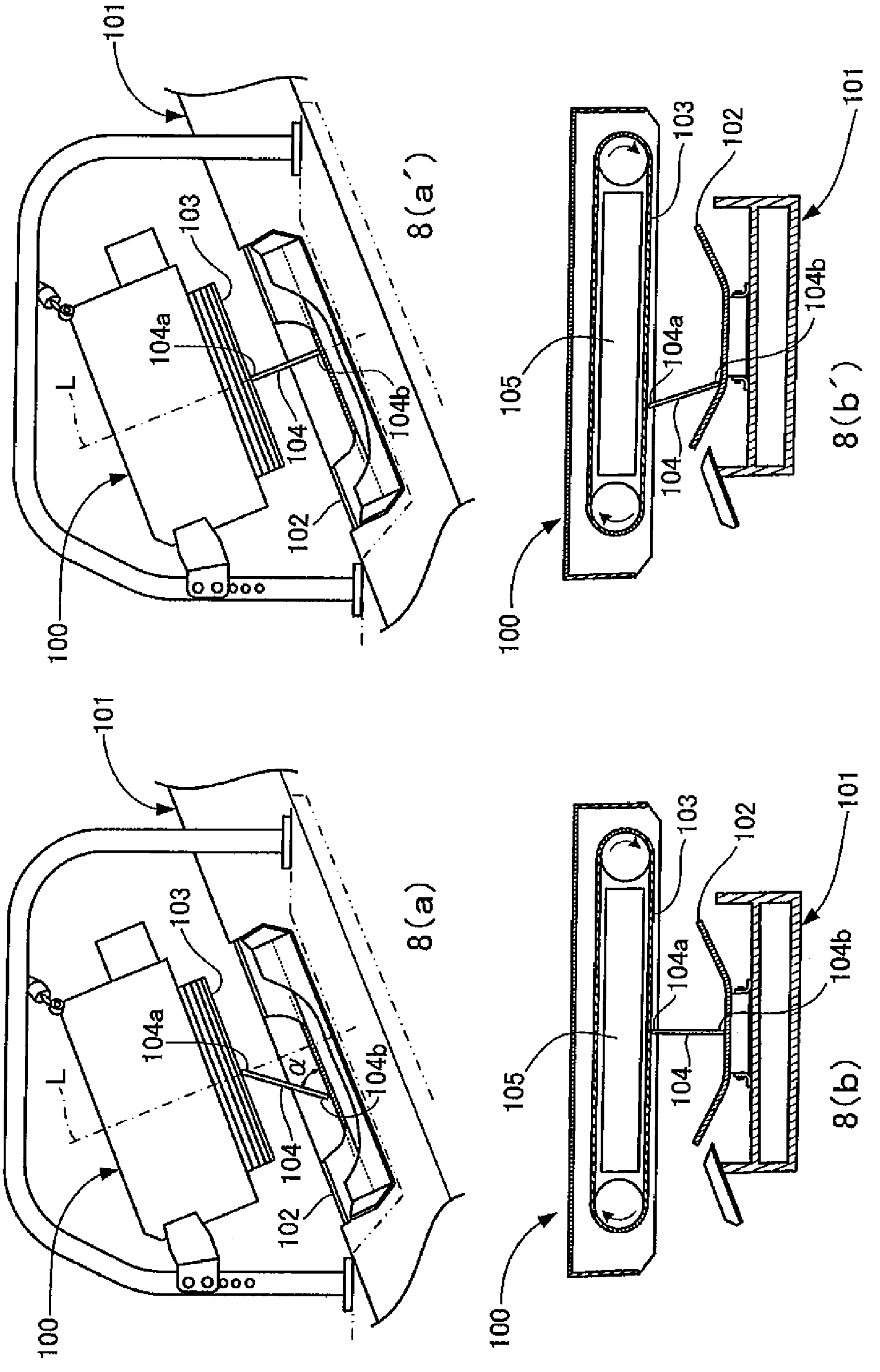
FIG.8 PRIOR ART
FIG. 8 shows diagrams for explaining a conventional technique.

Next, with making reference to the flow chart shown in FIG. 7, the contents of processing of the belt velocity control program will be described. Also note that the upper case letter "S" stands for "step" in FIG. 7. In addition, the contents of the processing hereinafter described are repeatedly executed in a predetermined cycle time.

Contents of Processing in Step S1

In Step S1, the MPU 40 determines whether or not the currently selected operation mode is the concrete aggregate mode, based on the switch select signal from the mode select switch 44.

The process moves forward to Step S2 if the MPU 40 determines that the concrete aggregate mode is being selected.

Contents of Processing in Step S2

In Step S2, the MPU 40 reads a set control current value $Ic_1$ currently set in response to a dial manipulated variable signal $Dc_1$ from the conveyor belt velocity control dial 45, and reads a set conveyor belt velocity $Vc_1$ corresponding to the set control current value $Ic_1$ based on the conveyor belt velocity control map of FIG. 6(*a*) in the memory 41. Then, the MPU 40 reads a set control current value $Im_1$ currently set, and reads a set magnetic separator belt velocity $Vm_1$ corresponding to the set control current value $Im_1$ based on the magnetic separator belt velocity control map of FIG. 6(*b*) retrieved from the memory 41. In the present embodiment, the magnetic separator belt velocity is fixed at a constant velocity.

Contents of Processing in Step S3

In Step S3, the MPU 40 compares the set conveyor belt velocity $Vc_1$ and the set magnetic separator belt velocity $Vm_1$ obtained respectively from the conveyor belt velocity control map and the magnetic separator belt velocity control map. And, the MPU 40 determines whether or not the set magnetic separator belt velocity $Vm_1(=Vm(Im_1))$ is lower than the set conveyor belt velocity $Vc_1(=Vc(Ic_1))$, i.e., $Vm_1<Vc_1$.

If the MPU 40 determines that the set magnetic separator belt velocity $Vm_1$ is lower than the set conveyor belt velocity $Vc_1$, i.e., $Vm_1<Vc_1$, the process moves forward to Step S4. Otherwise, the process moves forward to Step S7.

Contents of Processing in Steps 4-5

In Step S4, the MPU 40 reads a control current value $Ic_2$ from the conveyor belt velocity control map of FIG. 6(*a*) and sets the read control current value $Ic_2$ as a set control current value $Ic_2$ for transmission to the output interface 43. Here, the relationship between a conveyor belt velocity $Vc_2$ corresponding to the set control current value $Ic_2$ and the set magnetic separator belt velocity $Vm_1$ is that the former is lower than the latter, i.e., $Vc_2<Vm_1$.

Subsequently, in Step S5, the MPU 40 transmits both the set control current value $Ic_2$ and the set control current value $Im_1$ to the output interface 43, and the flow is terminated.

If, in Step S1, the MPU 40 determines, based on the switch select signal from the mode select switch 44, that the currently-selected operation mode is not the concrete aggregate mode (in other words, if the MPU 40 determines that the currently-selected operation mode is the stone crush mode), then the processing of Step S6 is carried out and the flow is terminated.

Contents of Processing in Step S6

In Step S6, the MPU 40 takes in the dial manipulated variable signal $Dc_1$ from the conveyor belt velocity control dial 45 and, in addition, finds the control current value $Ic_1$ corresponding to the dial manipulated variable signal $Dc_1$ by making reference to the conveyor belt velocity control map of FIG. 6(*a*). The MPU 40 sets the control current value $Ic_1$ thus found as the set control current value $Ic_1$ for transmission to the output interface 43 and then transmits it to the output interface 43.

If, in Step S3, the MPU 40 determines that the set magnetic separator belt velocity $Vm_1$ is equal to or higher than the set conveyor belt velocity $Vc_1$, i.e., $Vm_1 \geqq Vc_1$, the processing of Step S7 is carried out, and the flow is terminated.

Contents of Processing in Step S7

In Step S7, the MPU 40 transmits both the set control current value $Ic_1$ and the set control current value $Im_1$ to the output interface 43.

Upon execution of the processing of Step S5 in the self-propelled crushing machine 1 of the present embodiment, the control current $Ic_2$ is fed from the output interface 43 to the electric proportional control valve 35 of the conveyor belt drive means 17, while on the other hand the control current $Im_1$ is fed from the output interface 43 to the electric proportional control valve 39 of the magnetic separator belt drive means 25. As a result, the conveyor belt 16 is driven at the belt velocity $Vc_2$ by the conveyor belt drive means 17, while on the other hand the magnetic separator belt 23 is driven at the belt velocity $Vm_1(>Vc_2)$ by the magnetic separator belt drive means 25.

In addition, upon execution of the processing of Step S7, the control current $Ic_1$ is fed from the output interface 43 to the electric proportional control valve 35 of the conveyor belt drive means 17, while on the other hand the control current $Im_1$ is fed from the output interface 43 to the electric proportional control valve 39 of the magnetic separator belt drive means 25. As a result, the conveyor belt 16 is driven at the belt velocity $Vc_1$ by the conveyor belt drive means 17, while on the other hand the magnetic separator belt 23 is driven at the belt velocity $Vm_1(>Vc_1)$ by the magnetic separator belt drive means 25.

That is, once the concrete aggregate mode is chosen by manipulation of the mode select switch 44, the relationship in belt velocities between the conveyor belt 16 and the magnetic separator belt 23, in which the belt velocity, Vm, of the magnetic separator belt 23 is higher than the belt velocity, Vc, of the conveyor belt 16, is established, regardless of the conveyor belt velocity previously set by means of the conveyor belt velocity control dial 45.

Figure 4:
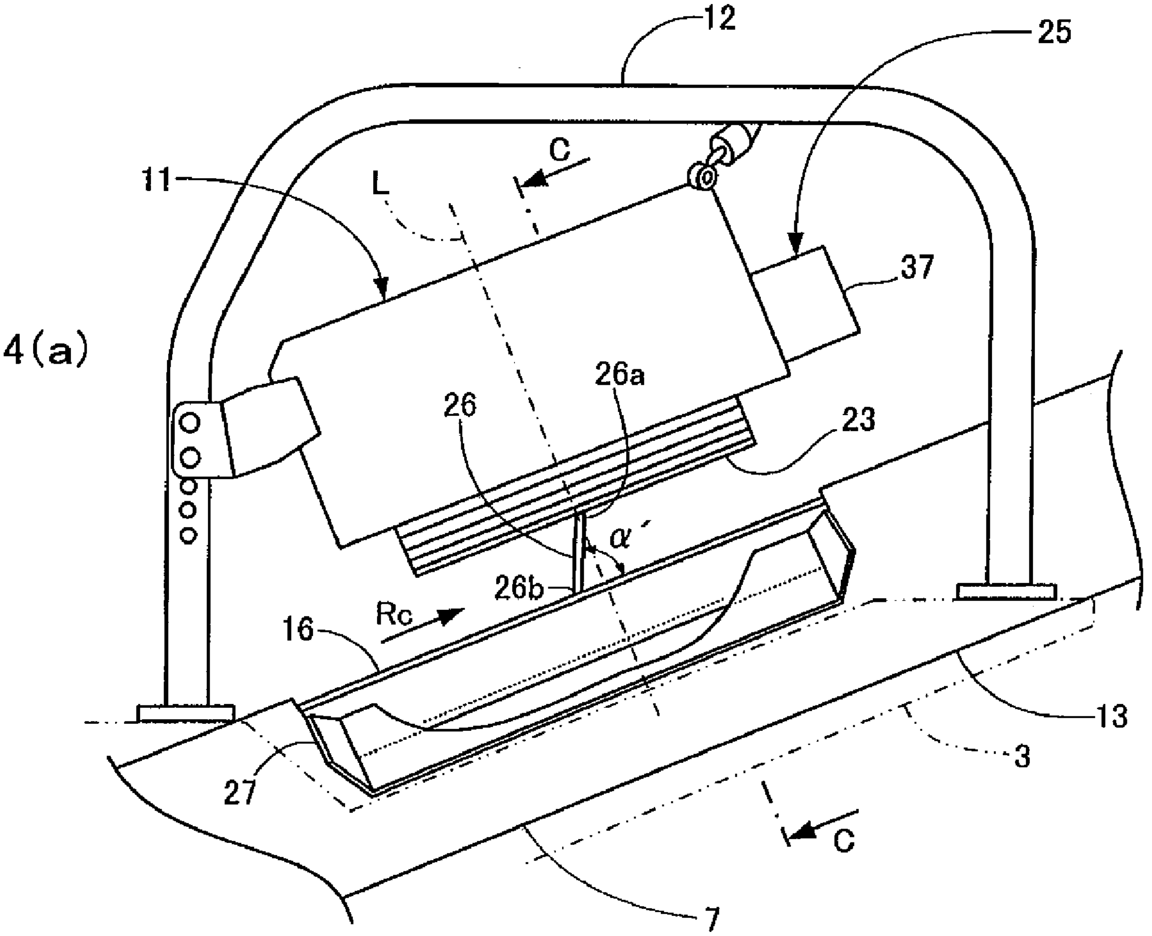
FIG. 4, comprised of FIGS. 4(*a*) and 4(*b*), is an enlarged view of section A of FIG. 2(*a*) wherein FIG. 4(*a*) illustrates the point of time at which the concrete reinforcing steel bar is taken off of a conveyor belt and FIG. 4(*b*) is a cross-sectional view taken along line C-C of FIG. 4(*a*).
Figure 4:
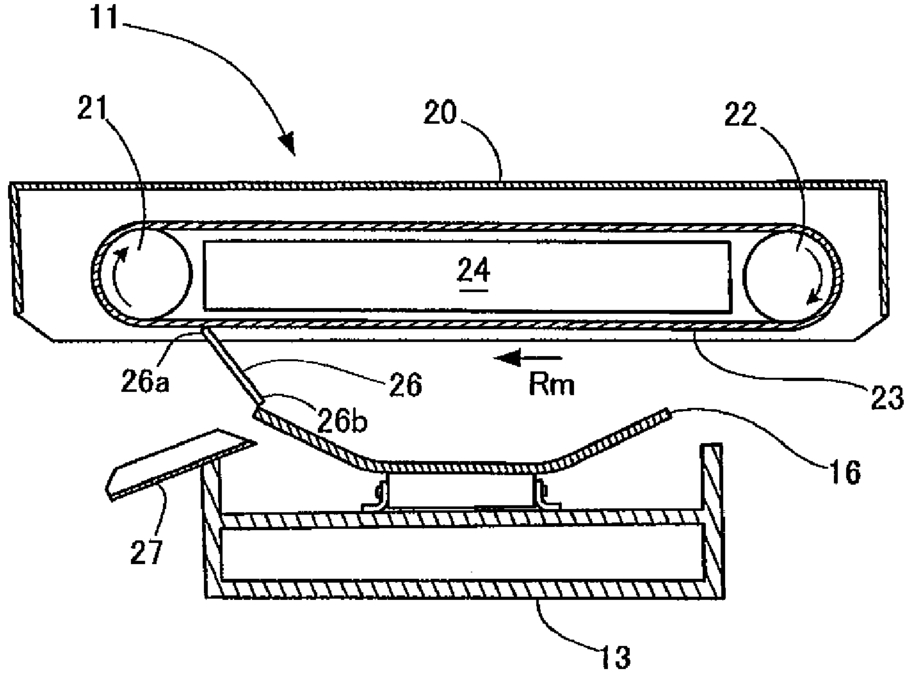

Referring now to FIGS. 2, 3 and 4, the following is a description of the operation of separation of the concrete reinforcing steel bar 26 by the magnetic separator 11 when the aforesaid belt velocity relationship of Vm>Vc is established.

In the event that the concrete reinforcing steel bar 26 rides and travels on the conveyor belt 16 along the belt travel direction, Rc, of the conveyor belt 16 as shown in FIG. 2(*b*) and the leading end 26*a* of the concrete reinforcing steel bar 26 is attracted and adhered to the magnetic separator belt 23 as shown in FIGS. 3(*a*) and 3(*b*), the leading end 26*a* of the concrete reinforcing steel bar 26 is shifted in the belt travel direction, Rm, of the magnetic separator belt 23 together with the magnetic separator belt 23, whereas the trailing end 26*b* of the concrete reinforcing steel bar 26 is shifted in the belt travel direction, Rc, of the conveyor belt 16, together with the conveyor belt 16.

The position of the leading end 26*a* of the concrete reinforcing steel bar 26 attracted and adhered to the magnetic separator belt 23 is indicated by line L (alternate long and short dash line) in FIG. 3(*a*). Line L represents a plane orthogonal to the belt travel direction, Rc, of the conveyor belt 16 and including the leading end 26*a*.

At the moment that the leading end 26*a* of the concrete reinforcing steel bar 26 is attracted and adhered to the magnetic separator belt 23, the concrete reinforcing steel bar 26, as viewed from the side of the conveyor belt 16, is placed in a tilted position to form an acute angle a with the conveyor belt 16 as shown in FIG. 3(*a*).

At the time just before the concrete reinforcing steel bar 26 attracted and adhered to the magnetic separator belt 23 is taken off of the conveyor belt 16 as illustrated in FIG. 4(*b*), the trailing end 26*b* of the concrete reinforcing steel bar 26 has not yet traveled past line L indicative of the leading end attraction/adhesion position at which the leading end 26*a* of the concrete reinforcing steel bar 26 is to be attracted and adhered to the magnetic separator belt 23, as shown in FIG. 4(*a*). At this point of time, the concrete reinforcing steel bar 26, as viewed from the side of the conveyor belt 16, is placed in a tilted position to form an acute angle $\alpha'(>\alpha)$ with the conveyor belt 16, as illustrated in FIG. 4(*a*). Therefore, the concrete reinforcing steel bar 26 in question is soon taken off of the conveyor belt 16.

Therefore, this ensures that the concrete reinforcing steel bar 26 is prevented from piercing into the conveyor belt 16.

Heretofore, the description has been made about the self-propelled crushing machine of the invention based on one embodiment thereof. It should however be noted that the invention is not necessarily limited to the particular configuration discussed in the one embodiment, and various changes and modifications may be accordingly made to the configuration without departing from the spirit and scope of the invention.

In the embodiment described herein, the concrete reinforcing steel bar 26 is taken off of the conveyor belt 16 before the trailing end 26*b* of the concrete reinforcing steel bar 26 travels past the leading end attraction/adhesion position L, whenever the relationship in belt velocities between the magnetic separator belt 23 and the conveyor belt 16 is that Vm (the belt velocity of the magnetic separator belt 23) is higher than Vc (the belt velocity of the conveyor belt 16), and there is shown an example in which, in order that the belt velocity relationship (Vm>Vc) may be established, the belt velocities of the conveyor belt 16 and the belt velocity of the magnetic separator belt 23 are controlled.

However, there is the possibility that, depending on the conditions (e.g., the width dimension of the conveyor belt 16, the distance between the conveyor belt 16 and the magnetic separator belt 23 and so on), the concrete reinforcing steel bar 26 may be taken off of the conveyor belt 16 before the trailing end 26*b* of the concrete reinforcing steel bar 26 travels past the leading end attraction/adhesion position L, even in conditions other than the belt velocity relationship (Vm>Vc) used in the one embodiment (for example, in the belt velocity relationship of Vm=Vc or Vm<Vc).

Therefore, it is conceivable to employ an embodiment in which the conveyor belt 16 and the magnetic separator belt 23 are controlled in their respective belt velocities so that there is established therebetween a belt velocity relationship (Vm=Vc or Vm<Vc) in addition to the belt velocity relationship (Vm>Vc) employed in the one embodiment.

To sum up, a relationship in belt velocities between the conveyor belt 16 and the magnetic separator belt 23 (in which relationship, before the trailing end 26*b* of the concrete reinforcing steel bar 26 travels past the leading end attraction/adhesion position L at which the leading end 26*a* of the concrete reinforcing steel bar 26 is to be attracted and adhered to the magnetic separator belt 23, the concrete reinforcing steel bar 26 attracted and adhered to the magnetic separator belt 23 is taken off of the conveyor belt 16) is pre-stored in the memory 41 using a format that incorporates the belt velocity relationship into the velocity control map of the conveyor belt 16 and the velocity control map of the magnetic separator belt 23. And, when the concrete aggregate mode is selected by manipulating the mode select switch 44, both the belt velocity of the conveyor belt 16 and the belt velocity of the magnetic separator belt 23 are controlled based on the belt velocity relationship stored in the memory 41, thereby to accomplish the operation and working effects described in the foregoing embodiment.

It will be apparent to those skilled in the art that various modifications and variations can be made in the disclosed crushing machine without departing from the scope or spirit of the invention. Other embodiments of the invention will be apparent to those skilled in the art from consideration of the specification and practice of the invention disclosed herein.

What is claimed is:

1. A self-propelled crushing machine having a conveyor belt which travels carrying crushed pieces of an object crushed by a crusher and a magnetic separator belt which is disposed above the conveyor belt and which travels in a direction intersecting the travel direction of the conveyor belt, whereby magnetic material pieces of the crushed pieces of the object are taken off of the conveyor belt, the self-propelled crushing machine comprising:

conveyor belt drive means by which the conveyor belt is driven at a conveyor belt velocity in response to a given conveyor belt velocity instruction signal;

magnetic separator belt drive means by which the magnetic separator belt is driven at a magnetic separator belt velocity in response to a given magnetic separator belt velocity instruction signal; and belt velocity instruction signal output means for providing a belt velocity instruction signal to the conveyor belt drive means and to the magnetic separator belt drive means, said belt velocity instruction signal being composed of a conveyor belt velocity instruction signal and a magnetic separator belt velocity instruction signal, said conveyor belt velocity instruction signal being provided to the conveyor belt drive means, and said magnetic separator belt velocity instruction signal being provided to the magnetic separator belt drive means;

wherein if the conveyor belt velocity in response to a set conveyor belt velocity instruction signal is higher than the magnetic separator belt velocity in response to the magnetic separator belt velocity instruction signal, the belt velocity instruction signal output means makes a change in the belt velocity instruction signal.

2. The self-propelled crushing machine as set forth in claim 1, further comprising:

memory means for pre-storing a magnetic separator belt velocity control map indicative of a relationship between the magnetic separator belt velocity instruction signal and the magnetic separator belt velocity and a conveyor belt velocity control map indicative of a relationship between the conveyor belt velocity instruction signal and the conveyor belt velocity;

wherein the belt velocity instruction signal output means finds a conveyor belt velocity and a magnetic separator belt velocity, respectively, from the conveyor belt velocity instruction signal and from the magnetic separator belt velocity instruction signal, by means of the conveyor belt velocity control map and the magnetic separator belt velocity control map both stored in the memory means.

3. The self-propelled crushing machine as set forth in claim 1, further comprising:

operation mode selector means for selecting one operation mode from among a plurality of preset operation modes depending on the operating conditions, wherein if a specific operation mode is selected by the operation mode selector means, the belt velocity instruction signal output means then makes a change in the belt velocity instruction signal.

4. The self-propelled crushing machine as set forth in claim 3, wherein the specific operation mode is an operation mode for crushing an object to be crushed that contains a concrete reinforcing steel bar.

5. The self-propelled crushing machine as set forth in claim 1, wherein the change in the belt velocity instruction signal is a change in the conveyor belt velocity instruction signal.

6. The self-propelled crushing machine as set forth in claim 1, wherein the magnetic separator belt velocity instruction signal is a signal that causes the magnetic separator belt to be driven at a fixed constant velocity.

7. The self-propelled crushing machine as set forth in claim 1, wherein the conveyor belt velocity is made lower than the magnetic separator belt velocity by making a change in the belt velocity instruction signal.

* * * * *